US008612274B2

(12) United States Patent
Gajewar et al.

(10) Patent No.: US 8,612,274 B2
(45) Date of Patent: Dec. 17, 2013

(54) PRICING ENGINE REVENUE EVALUATION

(75) Inventors: Amita Gajewar, San Jose, CA (US);
Jian Yang, Palo Alto, CA (US); Dongni Chen, Sunnyvale, CA (US); Peiji Chen, Saratoga, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/460,502

(22) Filed: Apr. 30, 2012

(65) Prior Publication Data

US 2013/0290069 A1 Oct. 31, 2013

(51) Int. Cl.
*G06Q 40/00* (2012.01)

(52) U.S. Cl.
USPC ........................................ 705/7.11; 705/7.42

(58) Field of Classification Search
USPC .............................................. 705/7.11, 7.42
See application file for complete search history.

(56) References Cited

U.S. PATENT DOCUMENTS

| 5,299,115 A * | 3/1994 | Fields et al. ................. 705/7.22 |
| 5,459,656 A * | 10/1995 | Fields et al. ................. 705/7.22 |
| 6,631,356 B1 * | 10/2003 | Van Horn et al. ............ 705/26.2 |
| 7,181,419 B1 * | 2/2007 | Mesaros ....................... 705/26.2 |
| 7,376,617 B2 * | 5/2008 | Jones ............................. 705/37 |
| 7,552,067 B2 * | 6/2009 | Nephew et al. .............. 705/7.25 |
| 7,610,212 B2 * | 10/2009 | Klett et al. .................... 705/7.12 |
| 7,747,473 B1 * | 6/2010 | Mesaros ....................... 705/26.2 |
| 2002/0069134 A1 * | 6/2002 | Solomon ......................... 705/26 |
| 2004/0093175 A1 * | 5/2004 | Tan .................................. 702/61 |
| 2005/0197896 A1 * | 9/2005 | Veit et al. ....................... 705/14 |
| 2008/0154664 A1 * | 6/2008 | Kuo et al. ......................... 705/7 |
| 2009/0112690 A1 * | 4/2009 | Brady ............................. 705/10 |
| 2010/0082392 A1 * | 4/2010 | Yang et al. ........................ 705/8 |
| 2010/0106556 A1 * | 4/2010 | Vee et al. ........................ 705/10 |
| 2010/0114696 A1 * | 5/2010 | Yang ........................... 705/14.49 |

* cited by examiner

*Primary Examiner* — Thomas Dixon
*Assistant Examiner* — Benjamin S Fields
(74) *Attorney, Agent, or Firm* — Brinks Gilson & Lione

(57) ABSTRACT

A simulation framework for evaluating revenue that may use a pricing engine that runs at least one pricing algorithm with particular configurations and under particular model market conditions to provide revenue projections.

20 Claims, 6 Drawing Sheets

PRICING ENGINE REVENUE EVALUATION

BACKGROUND

1. Field

Example embodiments relate to revenue evaluation of online advertising systems.

2. Description of the Related Art

Online advertising has become an emerging solution for organizations and individuals that wish to promote their goods and services, and providers of online advertising have reaped the rewards of this booming industry. Billions of dollars are now being spent per year on online advertising, and there seems to be no end to the growth of the Internet or online advertising.

One of the attractive features of online advertising is the various revenue models for online advertisement providers. Common revenue models can include cost per thousand impressions, cost per visitor, cost per view, cost per click, cost per action, cost per acquisition, cost per conversion, and fixed cost. Another attractive feature is the flexibility per revenue model. For example, in a cost per click model, a cost per click of a clickable advertisement or a cost per impression can vary depending on the content of the clickable advertisement or impression, respectively. Typically, advertisements that include content in high demand may warrant a higher associated cost. For example, an advertisement including the terms "free music download" is most likely in higher demand than an advertisement including "expensive paperclips." Therefore, the cost of the higher demand advertisement will be greater.

Despite the above features and countless other attractions that lure advertisers into online advertising, there are tradeoffs for advertisers and online advertisement providers. One tradeoff can be the complexity of determining pricing and potential revenue derived from an online advertisement; including determining revenue for the advertisement provider and revenue for the advertiser caused by an online advertisement. Because revenue evaluations for both the provider and the advertiser are complex and critical, both providers and advertisers would benefit from methods or systems for modeling advertising revenue.

SUMMARY

A method and system for running a simulation that includes running a supply-forecast module to obtain an eligible set of impressions that can be served for a set of queries, and running a price engine (PE) to compute a PE estimated price for the set of queries. Further, the method and system include running a price response module to estimate a demand for the set of queries with respect to an assumed demand curve, and running an admission control module to book the set of queries according to the estimated demand.

In one aspect, the method and system may further include generating a revenue evaluation with respect to the PE estimated price and the estimated demand. Also included, in one aspect, may be adding the set of recently booked queries to a list of previously booked queries and running an optimizer module to generate an allocation plan for impressions. Furthermore, in another aspect, the method and system may include generating impressions and running the admission control module to obtain an updated sell-through-rate (STR) for STR queries with respect to the generated impressions and the allocation plan for impressions, or may include generating a revenue evaluation with respect to the PE estimated price and the updated STR or the updated STR queries. Also, in one aspect, the method and system may further use information from the updated STR queries as a feedback to the PE for when the PE computes a PE estimated price for another set of queries.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

DETAILED DESCRIPTION OF EXAMPLE EMBODIMENTS

Figure 1:
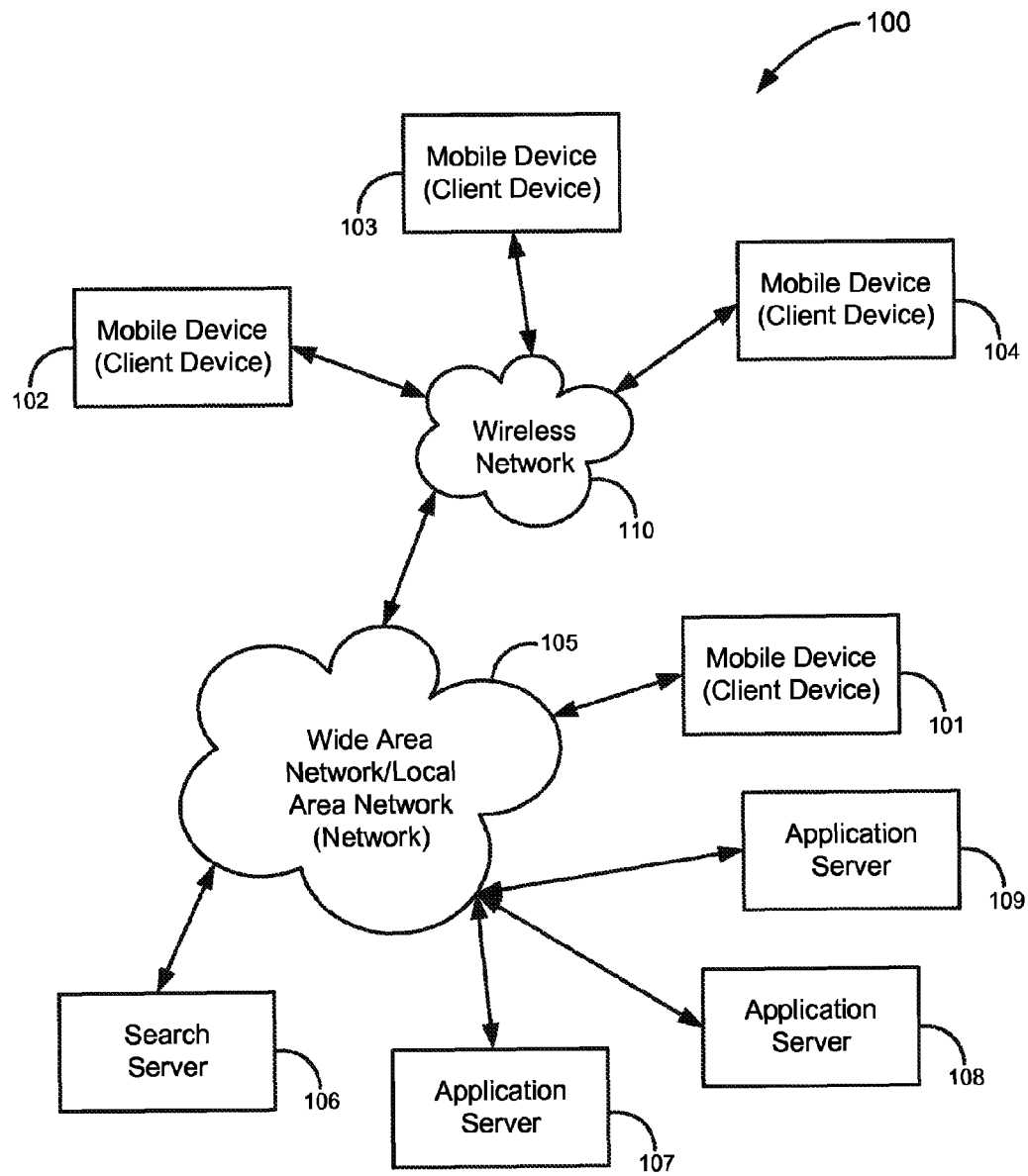
FIG. 1 illustrates a block diagram of one embodiment of a network 100 that can implement one embodiment of a simulation framework for evaluating revenue (also referred to herein as the SF)

Estimating revenue of an online advertising system is difficult due to immeasurable complexities that occur in real-world scenarios. By modeling a live online advertising system, a controlled environment can reduce these complexities and give a revenue projection that can facilitate determining future configurations for an online advertising system.

Described herein is a simulation framework for evaluating revenue (hereinafter referred to as the simulation framework or the SF) that may use a pricing engine (hereinafter referred to as the pricing engine or the PE) that runs at least one pricing algorithm with particular configurations and under particular model market conditions to provide revenue projections. These projections then can be evaluated with respect to the particular configurations and market conditions, to determine future configurations for future online advertising systems and real-world scenarios of such systems. In one embodiment, the running of the pricing algorithm can provide an evaluation of the behavior of the PE with respect to revenue under various configurations and market conditions, and a comparison of revenue obtained by the PE with respect to revenue obtain by existing real-world systems and scenarios.

In one embodiment, the SF can perform such functionality by way of a method. Such a method can include running a supply-forecast module to obtain an eligible set of impressions (also referred to as samples) that can be served for a set of queries (also referred to as contracts); and based upon contract information of the queries, the eligible set of samples, PE configuration, historical information based on past contracts (also referred to herein as booked contracts), and sell-through-rate (STR) contracts (which reflect current market conditions), running the PE to compute a PE estimated price for the set of queries. Also, the method can include running a price response module to estimate a new demand for the set of contracts with respect to an assumed demand curve. Further, the method can include running an admission control module to book the set of queries according to the estimated new demand. Furthermore, the method can include adding the set of recently booked contracts to a list of previously booked queries and running an optimizer module to generate an allocation plan that reflects inventory (such as impressions) allocated for booked contracts. Also, the method can include generating samples and running the admission control module to obtain a new STR for the STR contracts with respect to the generated samples and the allocation plan. Further, the method can include updating the STR contracts with the new STR(s), where the new STR(s) can reflect market conditions based on the historical information based on past booked contracts (e.g., booked contracts up until the updating). Furthermore, the method can include using information from the updated STR contracts as a feedback to the PE for when the PE computes a PE estimated price for another set of query contracts.

From the PE estimated price or an updated PE estimated price and the STR, the STR queries, the demand curve, or the updated demand, the SF can evaluate revenue.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

The terminology used in the specification is for the purpose of describing particular embodiments only and is not intended to be limiting of example embodiments of the invention. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. FIG. 1 illustrates a block diagram of one embodiment of a network 100 that can implement one embodiment of the SF.

Likewise, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof, and in the following description, the same reference numerals denote the same elements.

Now, in order to more specifically describe example embodiments of the present invention, various embodiments of the present invention will be described in detail with reference to the attached drawings. However, the present invention is not limited to the example embodiments, but may be embodied in various forms. In addition, the detailed is not intended as an extensive or detailed discussion of known concepts. As such, details that are known generally to those of ordinary skill in the relevant art may have been omitted or may be handled in summary fashion.

While example embodiments have been particularly shown and described with reference to FIGS. 1-5 it will be understood by one of ordinary skill in the art that various changes in form and details may be made therein without departing from the spirit and scope of example embodiments, as defined by the following claims.

FIG. 1 illustrates a block diagram of one embodiment of a network 100 that can implement one embodiment of the SF. As shown, FIG. 1, for example, includes a variety of networks, such as local area local area network (LAN)/wide area network (WAN) 105 and wireless network 110, a variety of devices, such as client device 101 and mobile devices 102-104, and a variety of servers, such as application servers 107-109 and search server 106.

A network, such as the network 100, may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network, such as wireless network 110, may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Figure 2:
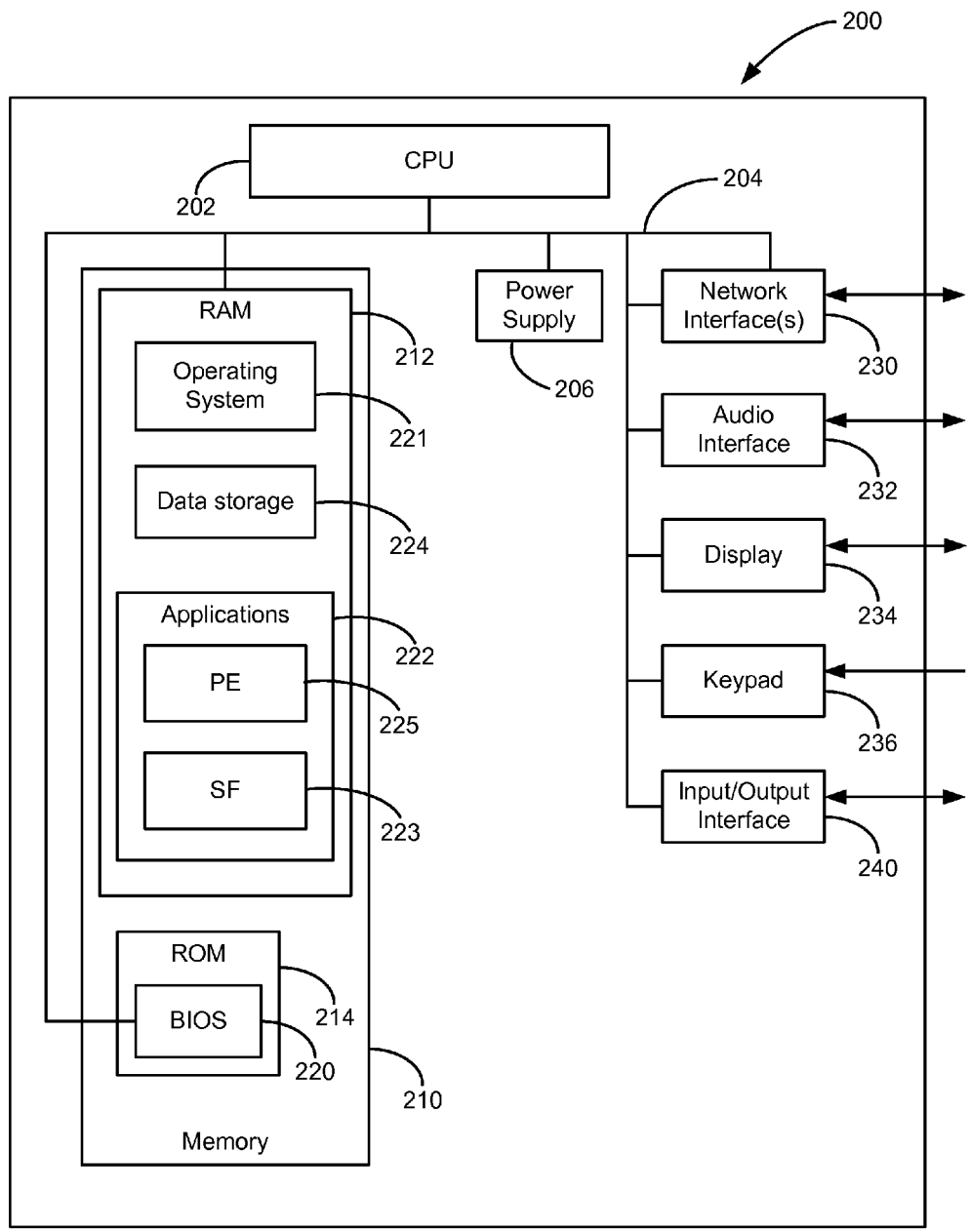
FIG. 2 illustrates a block diagram of one embodiment of an electronic device that can implement an aspect of one embodiment of the SF.

FIG. 2 illustrates a block diagram of one embodiment of an electronic device 200 that can implement an aspect of one embodiment of the SF. Instances of the electronic device 200 may include servers, such as servers 106-109, and client devices, such as client devices 101-104. In general, the electronic device 200 can include a processor 202, memory 210, a power supply 206, and input/output components, such as network interface(s) 230, an audio interface 232, a display 234, a key pad or keyboard 236, an input/output interface 240, and a communication bus 204 that connects the aforementioned elements of the electronic device. The network interfaces 230 can include a receiver and a transmitter (or a transceiver), and an antenna for wireless communications. The processor 202 can be one or more of any type of processing device, such as a central processing unit (CPU). Also, for example, the processor 202 can be central processing logic; central processing logic includes hardware, firmware, software and/or combinations of each to perform a function(s) or an action(s), and/or to cause a function or action from another component. Also, based on a desired application or need, central processing logic may include a software controlled microprocessor, discrete logic such as an application specific integrated circuit (ASIC), a programmable/programmed logic device, memory device containing instructions, or the like, or combinational logic embodied in hardware. Also, logic may also be fully embodied as software. The memory 210, which can include RAM 212 or ROM 214, can be enabled by one or more of any type of memory device, such as a primary (directly accessible by the CPU) and/or a secondary (indirectly accessible by the CPU) storage device (e.g., flash memory, magnetic disk, optical disk). The RAM can include an operating system 221, data storage 224, and applications 222, such as the SF 225 and the PE 223. The ROM can include BIOS 220 of the electronic device 200. The power supply 206 contains one or more power components, and facilitates supply and management of power to the electronic device 200. The input/output components can include any interfaces for facilitating communication between any components of the electronic device 200, components of external devices (such as components of other devices of the network 100), and end users. For example, such components can include a network card that is an integration of a receiver, a transmitter, and one or more I/O interfaces. A network card, for example, can facilitate wired or wireless communication with other devices of a network. In cases of wireless communication, an antenna can facilitate such communication. Also, the I/O interfaces, can include user interfaces such as monitors, keyboards, touchscreens, microphones, and speakers. Further, some of the I/O interfaces and the bus 204 can facilitate communication between components of the electronic device 200, and in one embodiment can ease processing performed by the processor 202.

Where the electronic device 200 is a client device, it can include a computing device capable of sending or receiving signals, such as via a wired or a wireless network. A client device may, for example, include a desktop computer or a portable device, such as a cellular phone telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

Also, a client device may vary in terms of capabilities or features. Claimed subject matter is intended to cover a wide range of potential variations. For example, a cell phone embodiment may include a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) or other location-identifying type capability, or a display with a high degree of functionality, such as a touch sensitive color 2D or 3D display, for example.

Further, a client device may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages regarding operation or configuration of the SF or the PE. A client device may also include or execute an application to communicate content related to the SF or the PE, such as, for example, textual content, multimedia content, or the like. A client device may also include or execute an application to perform a variety of possible tasks, such as browsing, searching, or analyzing forms of content related to the SF or the PE.

Where the electronic device 200 is a server, it can include a computing device that is capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Further, a server may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like. Particularly, the server may be an application server that includes a configuration to provide an application, such as the SF or the PE, via a network to another device. Also, an application server may, for example, host a website that can provide a user interface for the SF or the PE.

Further, an application server may provide a variety of services that include web services, third-party services, audio services, video services, email services, instant messaging (IM) services, SMS services, MMS services, FTP services, voice over IP (VoIP) services, calendaring services, photo services, or the like, all of which may work in conjunction with the SF or the PE. Examples of content provide by the abovementioned applications, including the SF and PE, may include text, images, audio, video, or the like, which may be processed in the form of physical signals, such as electrical signals, for example, or may be stored in memory, as physical states, for example.

Also, an application server may be or include an "ad server" that comprises a server that stores online advertisements for presentation to users. "Ad serving" refers to methods used to place online advertisements on websites, in applications, or other places where users are more likely to see them, such as during an online session or during computing platform use, for example.

During presentation of advertisements, a presentation system, such as a presentation system hosted by an application server, may collect descriptive content about types of advertisements presented to users. A broad range of descriptive content may be gathered, including content specific to an advertising presentation system. Advertising analytics gathered, such as advertising analytics generated by the SF or PE, may be transmitted to locations remote to an advertising presentation system for storage or for further evaluation, such as to remote application servers that host the SF or the PE. Where advertising analytics transmittal is not immediately available, gathered advertising analytics may be stored by an advertising presentation system until transmittal of those advertising analytics becomes available.

Figure 3:
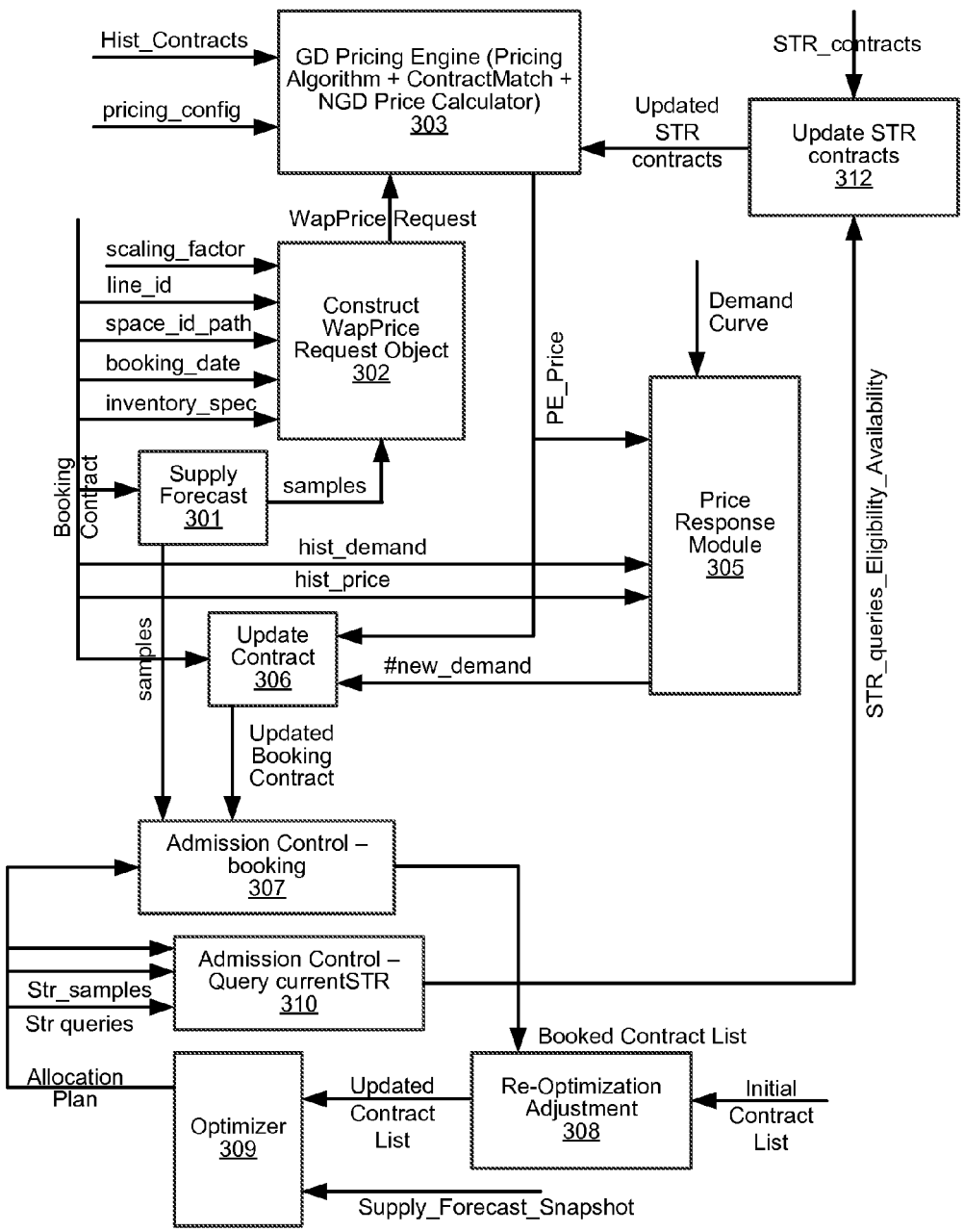
FIG. 3 illustrates a block diagram of an example architecture of one embodiment of the SF.

FIG. 3 illustrates a block diagram of an example architecture of one embodiment of the SF. This example architecture can support aspects of methods utilized by the SF, including aspects of a method 400 of FIG. 4, described below. Aspects of the architecture can be stored in memory of an electronic device, such as memory of an application server or the memory 110 of the device 200. The illustrated architecture includes a supply-forecast module 301, a PE estimated price request object 302, a PE 303, a price response module 305, an update contract object 306, an admission control module for booking contracts 307, an optimization adjustment object 308, an optimizer 309, an admission control module for generating STR 310 (where the admission control module for booking queries and for generating STR can be the same admission control module), and an update STR contract object 312. Each of these aspects of the architecture is described below.

As depicted, the supply-forecast module 301 may provide a set of impressions for a set of queries to the PE estimated price request object 302 that may facilitate input of the sets of queries into the PE 303. Then with respect to the object 302, historical query information, and a PE configuration input, the PE 303 may determine a PE estimated price.

The PE estimated price may be input for the price response module 305 and the update contract object 306. Further, along with the PE estimated price, a demand curve, historical demand information, and historical price information may be input for the price response module 305. The price response module with respect to these input parameters, may output an updated demand for the set of queries. The updated demand may be input for the update contract object 306.

Also depicted, the admission control module for booking contracts 307 may receive as input the update contract object 306, the set of impressions, and an allocation plan that may be outputted by the optimizer 309. As described in further taught below, the admission control module for booking contracts 307 or the admission control module for generating STR 310 may generate and output STR samples for STR queries using the allocation plan.

The optimizer may generate the allocation plan from a supply forecast snapshot (described below) and an updated query list (described below) that may include booked queries of the set of queries and an initial list of booked queries. The updated query list may be handled via the optimization adjustment object 308, which may receive as input the queries booked of the set of queries and the initial list of booked queries. Also, the booked queries may originate from the admission control module for booking contracts 307.

As mentioned above, the admission control module for generating STR 310 may receive the STR samples and STR queries along with the allocation plan. The admission control module 310 then may output STR for queries with respect to the allocation plan. The output of the admission control module for generating STR 310 may be input for the update STR contract object 312 that facilitates updating STR queries. This object 312 can then feed updated STR queries to the PE 303 that may generate the PE estimated price also with respect to the updated STR queries.

Figure 4:
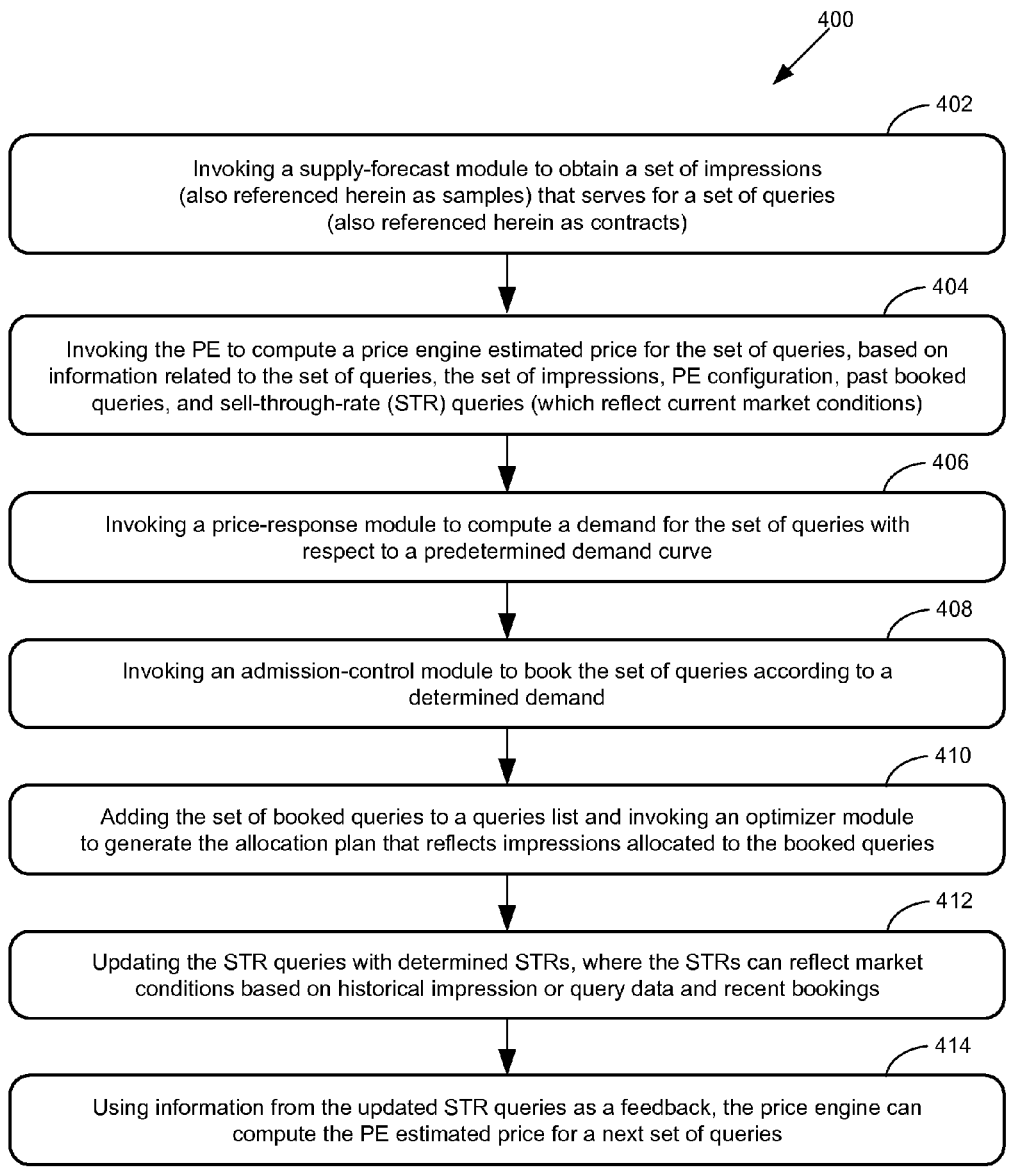
FIG. 4 illustrates a flowchart of an example method that can be supported by the architecture illustrated in FIG. 3 and performed by an electronic device, such an application server or the device of FIG. 2.

FIG. 4 illustrates a flowchart of one embodiment of the method performed by the SF, the method 400, which can also be performed by an electronic device, such an application server or, in general, the device of FIG. 2. In one embodiment, a processor, such as the processor 202 can perform the method 400 by executing processing device readable instructions encoded in the memory 210. As mentioned above, the method 400 and other methods described herein make use of at least the aspects of the architecture described in FIG. 3. Further, the method 400 can perform one or more sets of queries (which are further described below). In cases where there are sequential sets of queries, the method 400 can iterate for each set of queries, serially. For example, output of a first iteration the method 400 can be input of a second iteration, and output of the second iteration can be input of the third iteration, and so on.

The method 400 begins with running a supply-forecast module to obtain a set of impressions (also referenced herein as samples) for a set of queries (also referenced herein as contracts) (at 402). The set of impressions may be obtained for a specified time period, such as an earliest possible contract booking period. The supply-forecast module may return the set of impressions based on historical impression data with respect to a given property-profile (also referred to herein as the supply-forecast snapshot). The supply-forecast snapshot can include data related to or resulting from a PE simulation for a particular date or range of dates. In cases where this data results from the PE, the PE simulation can additionally use various pricing algorithms and parameters other than timing parameters. The set of queries can represent an inventory of a specific property profile available for purchase or purchased by an online advertiser. The specific property profile can include an amount of impressions available for an advertising program of a query. Impressions may include advertisements that can be served with specific content or a specific search, email advertisements, SMS text advertisements, voicemail advertisements, any other form of online or electronic advertisement, or any combination thereof.

The method 400 can then run the PE to compute a price engine estimated price for the set of queries, based on information related to the set of queries, the set of impressions, PE configuration, past booked queries, and sell-through-rate (STR) queries (which reflect current market conditions) (at 404). The PE configuration may define values for certain parameters that are used by the PE in computing the PE estimated price. In general, the PE can be setup to generate the PE estimated price for queries via a PE estimated price request object, and based on different PE configurations, the PE can output different PE estimated prices for that same set of queries. In one embodiment, the PE can compute a base price and perform adjustments according to a target STR and a current STR of STR queries. The PE estimated price can then be the result of these adjustments.

STR queries represent a specific property profile along with the profile's current STR and target STR for a predetermined period of time. Current STR represents current market conditions, whereas target STR represents the desired or expected STR for the specific property profile. STR of a given specific property profile for a specific duration of time can be equal to one minus the quotient of available impressions for the specific time period divided by eligible impressions for that specific time period. Target STR can be determined by a predetermined set of STR queries. In one embodiment, an admission control can generate STR samples for STR queries using an allocation plan (described below). Further, the admission control can examine an application server, such as an admission control server, to determine eligible impressions and available impressions for the STR queries and then from this determination calculate a current STR (e.g., STR=1−(currently available impression/eligible impressions)).

In one embodiment, the PE can include one or more pricing algorithms, a NGD-price computation (a computation resulting in a price of a contract for a non-guaranteed delivery (NGD) market), a GD-price computation (a computation resulting in a price of a contract for a guaranteed delivery (GD) market), and contract matching (matching samples with past contracts). The PE may compute a price to be used as a guideline to book guaranteed delivery (GD) or non-guaranteed delivery (NGD) contracts. As mentioned above, the PE can first calculate the base price based on past booked contracts and then make adjustments according to changes in market conditions, such as market conditions represented by a target and/or current STR(s).

Also, the method 400 can run a price response module to compute a demand for the set of queries with respect to a predetermined demand curve (at 406). The price response module may also factor in the PE estimated price for each query in a set of queries. In one embodiment, when the PE computes the price of a contract to be booked, it runs the price response module to compute how much demand may occur based on the PE estimated price. The computation may also be based on historical impression or query data for a specified price or specified demand. This information in addition to the predetermined demand curve can be provided as input to the price response module.

In another embodiment, for each contract, the price response module receives historical impression or query data, historical demand data, and the PE estimated price. Then based on this input, will determine a new demand for each contract. Also, for each contract, demand and other parameters can be updated via an update contract object. In simulation runs, the SF can book a contract according to the PE estimated price and updated demand. Further, different predetermined demand curves can be used for comparative studies across various simulation runs. In short, the price response module facilitates simulating real-world scenarios where change in price may result in change in demand.

Figure 5A:
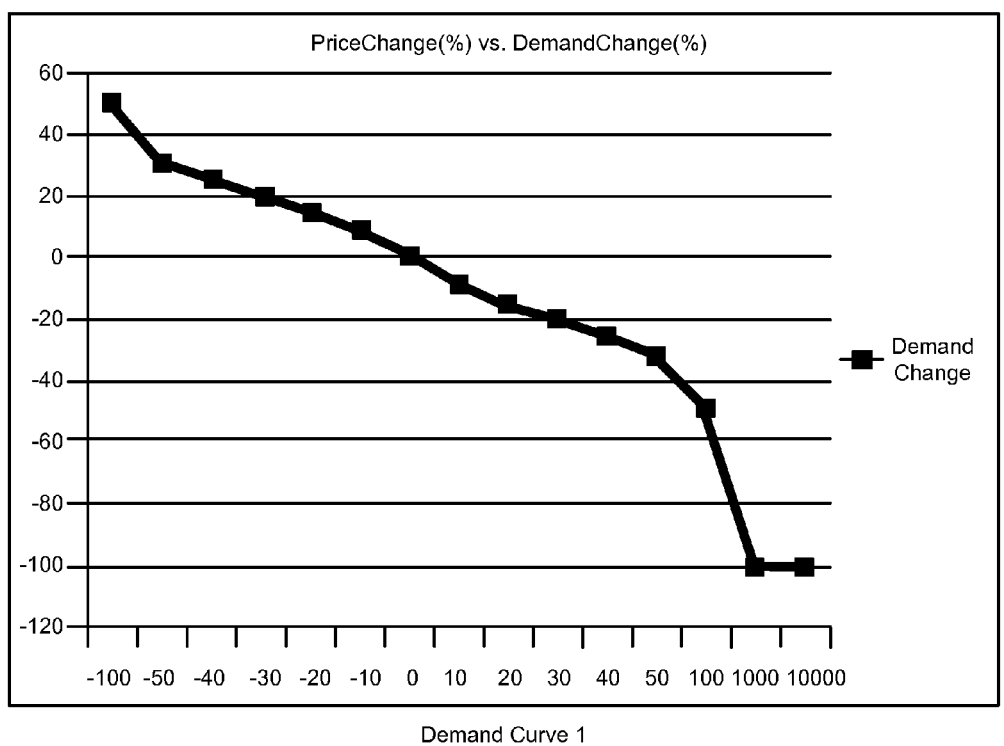
FIGS. 5A and 5B illustrate example demand curves that can be utilized by an aspect of the architecture illustrated in FIG. 3 and the method illustrated in FIG. 4.
Figure 5B:
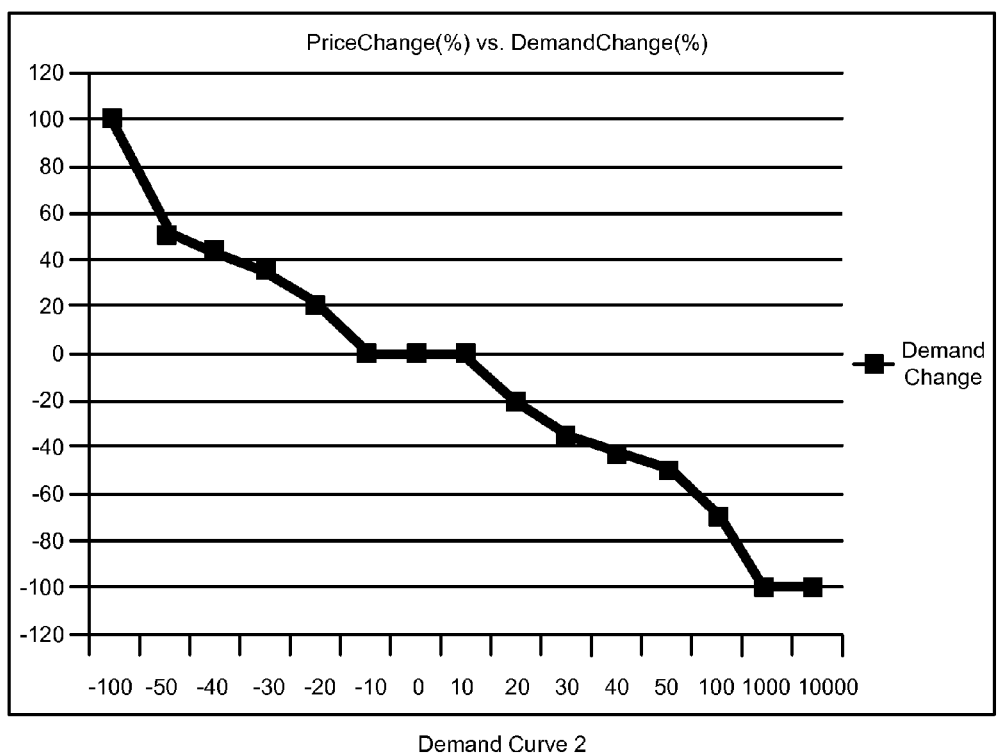

In FIGS. 5A and 5B, depicted are two sample demand curves that can be used for running simulations. The x-axis represents change in the price of a query, and the y-axis represents change in demand as a result of the change in price. In one embodiment, different simulations can use different demand curves while retaining same SF and PE configurations; and therefore, in such an embodiment, revenue can be measured with respect to demand. In another embodiment, different simulations can use different demand curves and various SF and/or PE configurations; and therefore, revenue can be measured with respect to demand and SF and/or PE configurations.

Also, the method 400 can run an admission control module (the booking module) to book the set of queries according to a determined demand (at 408). In one embodiment, depending on the allocation plan, the admission control module may set a partial demand of a contract. Also, the booking module can receive as input the allocation plan and samples for a given query, and can return a number of eligible impressions and available impressions for that query.

Further, the method 400 can add the set of booked queries to a queries list and run an optimizer module to generate the allocation plan that reflects inventory allocated to the booked queries (at 410). The optimizer module may have various configurations, so that the allocation plan can be regenerated (or optimized) via an optimization adjustment object into various versions. For a given list of contracts (query list), the optimizer module can generate the allocation plan which can include information to be used at when serving an impression. Also, the allocation plan can be used to determine the allocated inventory for each of the queries in the list of contracts. Moreover, the allocation plan can be generated serially, so that input to generate a second allocation plan for a second set of queries can include a first allocation plan for a first set of queries, and input to generate a third allocation plan for a third set of queries can include the first allocation plan and/or the second allocation, and so on. Also, each query in a set of booked queries may have its own allocation plan; and each allocation plan for each query can be generated serially, so that input for generating an allocation plan for one query can include an allocation plan of another query in the same set of queries.

In addition, as suggested above, the method 400 can update the STR queries with determined STRs via an update STR contract object, where the STRs can reflect market conditions based on historical impression or query data and recent bookings (at 412). Further, using information from the updated STR queries as a feedback, the price engine can compute the PE estimated price for a next set of queries (at 414).

Thus, an offline simulation run can include multiple cycles of optimization (allocation), sample generation, current STR generation, PE estimated price computation, simulating changing market conditions using a price response module, and booking contracts using an admission control module. Once all the sets of queries are booked, all the booked queries and the query lists are combined into one universal contract list. This universal list can then be utilized for NGD-price integrated optimization to generate an allocation plan for an NGD estimated price. Then for revenue analysis and reporting, the SF can use information from the NGD allocation plan optionally along with a universal allocation plan for a GD estimated price. Further, revenue analysis and reporting can be performed by the SF for each set of queries run in a simulation, solely, or in addition to the universal analysis and reporting on revenue.

As suggested above, the SF makes certain assumptions that simplify aspects of online advertising that occurs in real-world scenarios. For example, while updating STR for STR queries, contract delivery may be assumed to be linear over a duration of the queries. Also, for example, demand curve assumptions may not necessarily reflect a real-world-price-demand relationship. Further, for example, while comparing net revenue, revenue obtained from exclusive contracts may not be considered. Although such assumptions may be made, users of the SF described herein can benefit from various on-line advertising revenue evaluations.

With further reference to advertisements or impressions of advertisements of an off-line (simulated) or live online advertising system and various monetization techniques or models associated with such advertisements and impressions, such may include advertisements and impressions associated with user search queries, or non-sponsored search advertising, including graphical or display advertising. In an auction-type online advertising marketplace, advertisers may bid in connection with placement of advertisements, although other factors may also be included in determining advertisement selection or ranking. Bids may be associated with amounts advertisers pay for certain specified occurrences, such as for placed or clicked-on advertisements, for example. Advertiser payment for online advertising may be divided between parties including one or more publishers or publisher networks, one or more marketplace facilitators or providers, or potentially among other parties.

As suggested above, some models may include guaranteed delivery advertising, in which advertisers may pay based at least in part on an agreement guaranteeing or providing some measure of assurance that the advertiser will receive a certain agreed upon amount of suitable advertising, or non-guaranteed delivery advertising, which may include individual serving opportunities or spot market(s), for example. In various models, advertisers may pay based at least in part on any of various metrics associated with advertisement delivery or performance, or associated with measurement or approximation of particular advertiser goal(s). Models may include, among other things, payment based at least in part on cost per impression or number of impressions, cost per click or number of clicks, cost per action for some specified action(s), cost per conversion or purchase, or cost based at least in part on some combination of metrics, which may include online or offline metrics, for example.

Further, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers.

For web portals like Yahoo!, advertisements may be displayed on web pages resulting from a user's defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile's type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users.

In short and as described above in detail, there are several parameters and configurations associated with online advertising and related queries (contracts). Taking into account one or more of these parameters and configurations, a PE can generate a PE estimated price. Then from this PE estimated price and a STR or a demand for an advertisement, the SF can evaluate revenue.

We claim:

1. A method for running a simulation of an online advertising system, comprising:

running, by a computer processor, a supply-forecast module to obtain an eligible set of impressions that can be served for a set of queries;

running, by a computer processor, a price engine (PE) to compute a PE estimated price for the set of queries;

running, by a computer processor, a price response module to estimate a demand for the set of queries with respect to an assumed demand curve; and running, by a computer processor, an admission control module to book the set of queries according to the estimated demand.

2. The method of claim 1, further comprising:
generating, by a computer processor, a revenue evaluation with respect to the PE estimated price and the estimated demand.

3. The method of claim 1, further comprising:
adding, by a computer processor, the set of recently booked queries to a list of previously booked queries and running an optimizer module to generate an allocation plan for impressions.

4. The method of claim 3, further comprising:
generating, by a computer processor, impressions and running the admission control module to obtain an updated sell-through-rate (STR) for STR queries with respect to the generated impressions and the allocation plan for impressions.

5. The method of claim 4, where the updated STR reflects market conditions based on historical information based on past booked queries.

6. The method of claim 4, further comprising:
generating, by a computer processor, a revenue evaluation with respect to the PE estimated price and the updated STR.

7. The method of claim 4, further comprising:
updating, by a computer processor, the STR queries with the updated STR.

8. The method of claim 7, further comprising:
generating, by a computer processor, a revenue evaluation with respect to the PE estimated price and the updated STR queries.

9. The method of claim 7, further comprising:
using, by a computer processor, information from the updated STR queries as a feedback to the PE for when the PE computes a PE estimated price for another set of queries.

10. The method of claim 7, where the computation of the PE estimated price for the set of queries is based on information regarding the set of queries and the set of impressions, PE configuration, historical information based on past booked queries, and the updated STR queries.

11. A non-transitory computer readable medium, comprising:
instructions executable by a processor to execute a supply-forecast module to obtain an eligible set of impressions that can be served for a set of queries;
instructions executable by a processor to execute a price engine (PE) to compute a PE estimated price for the set of queries;
instructions executable by a processor to execute a price response module to estimate a demand for the set of queries with respect to an assumed demand curve; and
instructions executable by a processor to execute an admission control module to book the set of queries according to the estimated demand.

12. The non-transitory computer readable medium of claim 11, where the medium further includes:
the instructions executable by a processor to generate a revenue evaluation with respect to the PE estimated price and the estimated demand.

13. The non-transitory computer readable medium of claim 11, where the medium further includes:
instructions executable by a processor to add the set of recently booked queries to a list of previously booked queries and running an optimizer module to generate an allocation plan for impressions.

14. The non-transitory computer readable medium of claim 13, where the medium further includes:
instructions executable by a processor to generate impressions and running the admission control module to obtain an updated sell-through-rate (STR) for STR queries with respect to the generated impressions and the allocation plan for impressions.

15. The non-transitory computer readable medium of claim 14, where the updated STR reflects market conditions based on historical information based on past booked queries.

16. The non-transitory computer readable medium of claim 14, where the medium further includes:
instructions executable by a processor to generate a revenue evaluation with respect to the PE estimated price and the updated STR.

17. The non-transitory computer readable medium of claim 14, where the medium further includes:
instructions executable by a processor to update the STR queries with the updated STR.

18. The non-transitory computer readable medium of claim 17, where the medium further includes:
instructions executable by a processor to generate a revenue evaluation with respect to the PE estimated price and the updated STR queries.

19. The non-transitory computer readable medium of claim 17, where the medium further includes:
instructions executable by a processor to use information from the updated STR queries as a feedback to the PE for when the PE computes a PE estimated price for another set of queries.

20. The non-transitory computer readable medium of claim 17, where the computation of the PE estimated price for the set of queries is based on information regarding the set of queries and the set of impressions, PE configuration, historical information based on past booked queries, and the updated STR queries.

* * * * *